O. H. BURDICK.
Harvester Rake.
No. 84,730.
Patented Dec. 8, 1868.
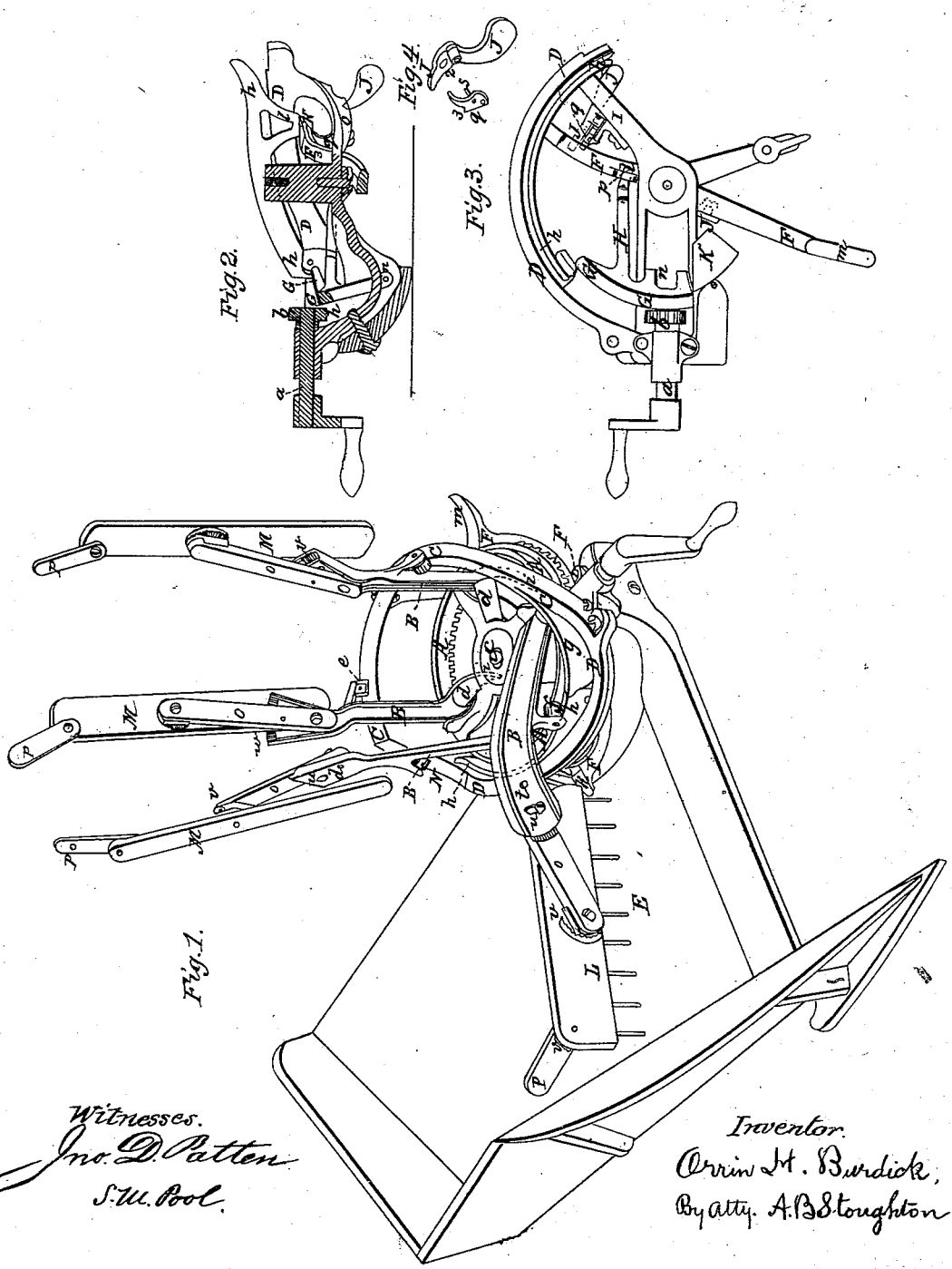

UNITED STATES PATENT OFFICE.

ORRIN H. BURDICK, OF AUBURN, NEW YORK, ASSIGNOR TO HIMSELF AND DAVID M. OSBORNE, OF SAME PLACE.

IMPROVEMENT IN HARVESTER-RAKES.

Specification forming part of Letters Patent No. 84,730, dated December 8, 1868.

*To all whom it may concern:*

Be it known that I, ORRIN H. BURDICK, of Auburn, in the county of Cayuga and State of New York, have invented certain new and useful Improvements in Rakes for Harvesting-Machines; and I do hereby declare the following to be a full, clear, and exact description of the same, reference being had to the accompanying drawings, making a part of this specification, in which—

Figure 1 represents a perspective view of the rake and its operative mechanism, in connection with the platform of a harvesting-machine, over or with which it works. Fig. 2 represents a vertical section through the rake-operating mechanism, and Fig. 3 represents a top plan of the same. Fig. 4 represents, in perspective, two of the pieces of the rake-operating mechanism detached, they not being distinctly seen in their working positions in the other figures.

Similar letters of reference, where they occur in the separate figures, denote like parts of the mechanism in all of the drawings.

My invention relates to the manner of driving and controlling a series of revolving and rising-and-falling arms, one of which, at least, is a rake, and the others beaters, for drawing in the grain to the cutters of a harvesting-machine, while the rake delivers it, after it is cut, in a gavel on the ground, by the side of the platform.

And my invention consists, first, in the use of a certain adjustable camway, in combination with a permanent camway, for the purpose of raising the rake over the grain that may be on the platform, when it is desired to use the rake as a beater only.

My invention further consists in the combined use of two adjustable camways, for controlling the action of the rake.

My invention further consists in the combination of the permanent and movable camways with a raising-lever, trigger, and trip, so that the arm of the series which acts as a rake may be allowed to rake or not, as occasion may require, and so that it will, when thus thrown out of raking action, trip the movable way and put itself in raking position on the next round, if required.

And my invention further consists in certain adjustments of the rake and beater or reel heads on the revolving arms, to adapt them to the varied condition of the grain as it is found in the field.

To enable others skilled in the art to make and use my invention, I will proceed to describe the same with reference to the drawings.

The shaft $a$, carrying a pinion, $b$, is rotated from the main drive-wheel in any of the usual well-known ways; and this pinion $b$ works into and turns a crown-wheel, A, which is supported on a vertical journal or shaft, $c$, supported on the main frame.

On the wheel A are radially hung the hubs $d$ of the revolving arms B, so that, while they revolve with said wheel, they may also have a rising and falling motion on their journals; but this rising and falling motion of the arms is not in a line radial to the wheel, but in lines at right angles to the hubs or radii of the wheel.

Around or margining the wheel A, though in planes oblique to the plane of said wheel, there are two permanent camways, C D, upon which the friction-rollers $e$ of the beater or reel arms run, and upon which, also, the friction-roll $f$ of the rake-arm runs in part, said last-mentioned roll being longer than those, $e$, which causes it to take or reach onto a permanent ledge, $g$, on the camway C, and which ledge leads and directs said roller $f$ onto the switched or movable camway $h$, by which the rake and rake-arm may at any time be raised up, so that the rake will pass over the grain on the platform E without touching it.

The arms B are each furnished with a tail-piece, $i$, for holding them from rising at certain points or positions, but which, at other points or under other circumstances, do not restrain the arms from rising, as will be explained.

F is a foot-lever, extending into a position where it is readily accessible to the driver on his seat, and is pivoted to the frame at $j$. This lever F extends across to and under the switch-camway $h$, its extreme point $k$ taking against a downward projection, $l$, on the switch-camway, so that the driver, by pressing down the end $m$ of the lever F with his foot or otherwise, raises up the switch-camway $h$.

Underneath the wheel A there is pivoted, as at $n$, Figs. 2 and 3, a camway, G, to which is fastened a bent arm, H, and the point 1 of this bent arm passes into or through a loop, $p$, on the lever F, so that the operating of the lever F upon its pivot will also operate the camway G upon its pivot, and move it out of or into the path of the tail of the rake-arm, as the action of the rake, for the time being, may require.

To a projection, $r$, on one of the permanent supports I of the permanent camway D, there is pivoted a dog, $q$, and on the same projection $r$, and in close proximity to the dog $q$, there is pivoted a trigger, J, and a stud, $s$, on the dog enters a cam-slot, 2, in the trigger, (see Fig. 4,) so that the moving of one will operate the other, and the moving of the lever F admits of the operation of both through the weighted end of the lever J.

The dog $q$ has a shoulder, 3, upon it, which, when the camway $h$ is raised up by the lever F, takes under said lever, and holds it and the camway both up.

The trigger is overpoised or weighted, so that when not otherwise controlled its weighted end will drop, and correspondingly raise its other end; and as its lighter end rises, it carries up the dog $q$ with it until its notch or sear 3 takes under the lever F, or against a projection thereon, and holds it up.

The dropping of the weighted end of the trigger J brings the tail-piece of the dog $q$ up within the path of the tail-piece of the rake-arm, and as that tail-piece comes around it strikes the dog $q$, which moves the weighted trigger from under the lever, and allows the lever F, and consequently the camway $h$, to drop.

Just before the tail-pieces $i$ of the arms B arrive at the hinged and movable camway G, they pass over a permanent cam, K, which prevents the rake or reel beaters from rising; and the location of this cam K is such as that while the tail of the beater-arm is passing over it the beater itself is entering the standing grain, to reel or draw it toward the cutters, and at this part of its operation it should be held somewhat up to its work, to prevent it from leaving the grain. By the time the beater has drawn its portion of the grain to the cutters, and it is severed from the stubble, the tail-piece of that beater has passed beyond the cam K, and it is then free to be raised up out of the way.

As the rake L serves also as a beater or reel, it must be and is held to the grain by its tail-piece moving against the cam K; but as the rake performs another duty which the beaters do not perform—namely, sweeps the grain off from the platform onto the ground, or to pass over without touching it, as occasion may require—other provision for holding or releasing it must be made, and this is done by the hinged camway G, which is operated by the lever F.

If the lever F remains untouched, the rake L will clear the platform at every rotation of the wheel A; but if the rake is not to sweep the platform, then the end $m$ of the lever F is forced down, which moves the cam G out of the way of the path of the tail-piece, raises the switch-camway $h$, and operates the dog $q$, and sets the trigger J, and then the rake-arm, through its roller $f$, rides upon the raised camway $h$, and passes over the grain upon the platform without touching it.

When the tail-piece of the rake-arm comes to the tail-piece of the dog $q$, it moves the trigger J from under the lever F, and the switch-camway $h$ drops, and the camway G rocks back into position for catching the tail of the rake at the next rotation.

As the arms come to the steep part of the camway, as at N, they are raised up into a vertical, or nearly so, position, and remain so until they are about to drop and reach into the grain to reel it into the cutters.

The rake and beater heads L M are fastened to their arms B, respectively, by a bolt, $t$, and set-screw and slot $u$, and an arm, $o$, and at each of the bearing-points serrated, notched, or otherwise roughened metallic bearing-pieces $v$ are placed, so that when adjusted and drawn together they cannot readily change position, while they are susceptible of being put into any desired position.

Upon the extreme outer ends of the rake and beater heads are placed supplementary arms P, which can be raised or lowered at pleasure, and reach farther out into the standing grain, and move closer to the outside dividing-board, as may be desired.

The arm on the rake-head is held in its adjusted position by the roughened surfaces $v'$ above mentioned; but those on the beaters may be simply bolted, so that if they should strike against anything unyielding on the platform it would simply raise up the beater on its journal; but the rake, at times, has not this facility of rising, as it must be forcibly held to the grain it is sweeping from the platform, and hence its arm must be more rigidly and firmly held against any such casualty.

Having thus fully described my invention, what I claim therein as new, and desire to secure by Letters Parent, is—

1. The adjustable camway $h$, in combination with the permanent camway $g$, for the purpose of raising the rake over the grain that may be on the platform, when it is desired to use the rake as a beater only, substantially as described.

2. The combination of the two adjustable camways G $h$, for controlling the action of the rake, substantially as herein described.

3. In combination with the fixed or permanent camways for guiding and controlling a series of rake and beater arms in their rotation, the lever F, and movable camways, dog, and trigger, for allowing the driver from his seat to control the rake and throw it out of raking action, while the rake itself sets the parts for allowing it to go into raking action, substantially as described.

4. In combination with the rake and beater heads, the auxiliary arms P and the three adjustable fastenings, $u$, $v$, and $v'$, for giving such heads and arms the requisite inclinations upon their arms B, substantially as described.

ORRIN H. BURDICK.

Witnesses:
 ENOS B. IVES,
 F. WRIGHT.